United States Patent

Penzias

[11] Patent Number: 5,805,680
[45] Date of Patent: Sep. 8, 1998

[54] METHOD AND APPARATUS FOR TELEPHONE CALL SUB-BILLING

[75] Inventor: Arno Allan Penzias, Chatham, N.J.

[73] Assignee: AT&T Corp., Middletown, N.J.

[21] Appl. No.: 582,006

[22] Filed: Jan. 2, 1996

[51] Int. Cl.⁶ .................................................. H04M 15/00
[52] U.S. Cl. ........................ 379/118; 379/114; 379/119; 379/127; 379/167; 379/183
[58] Field of Search .................................... 379/114, 115, 379/117, 118, 120, 121, 126, 127, 130, 134, 140, 154, 155, 193, 196, 197, 198, 199, 201, 167, 171, 172, 173, 180, 183, 191, 245, 251, 119, 111

[56] References Cited

U.S. PATENT DOCUMENTS

| | | | |
|---|---|---|---|
| 3,922,498 | 11/1975 | Aul et al. | 379/115 |
| 4,054,942 | 10/1977 | Chambers, Jr. | 379/118 |
| 4,099,031 | 7/1978 | Proctor et al. | 379/183 |
| 4,149,040 | 4/1979 | Atkinson | 379/183 |
| 5,475,744 | 12/1995 | Ikeda | 379/127 |

*Primary Examiner*—Curtis A. Kuntz
*Assistant Examiner*—Binh K. Tieu

[57] ABSTRACT

A "breakout" of telecommunications toll calls on a per-station basis is provided to households or other telecommunications endpoints which have subscribed to only a single analog telephone line. Subscribers wishing to avail themselves of such "station set billing" will have purchased and installed telephone stations sets which are adapted to transmit to the telecommunications service provider, during a call, e.g., at the start thereof, a signal carrying a code which identifies that station set. The subscriber, additionally, will have registered the station set's code, which may be marked on the bottom of the instrument, with the telecommunications service provider. Thus the service provider is able to identify which station set within the household a call is being made from or to which a collect call is being made. The telecommunications service provider can thus readily "tag" the toll charge for that call in the subscriber's monthly bill as having been made from, or billed to, a particular station set, hereby effectuating the inventive "station set billing" service. The station set may transmit the code at its own initiative. Alternatively, it may transmit the code in response to a query signal issued by the telecommunications service provider's equipment during call set-up. Preferably, the station set's code signal, as well as the query signal are of a type that cannot be heard by the human auditory system, such as a spread spectrum signal, thereby making the interchange of query and identifying signal imperceptible to the callers.

6 Claims, 6 Drawing Sheets

*FIG.* 5

METHOD AND APPARATUS FOR TELEPHONE CALL SUB-BILLING

TECHNICAL FIELD

The present invention relates to telecommunications, and in particular, to systems that generate bills to be sent to subscribers for their use of telephone service.

BACKGROUND OF THE INVENTION

Many businesses find it desirable to have the telecommunications costs incurred by individual employees identified as such in the monthly bill presented to the business by its telecommunications service provider(s). In the context of, for example, a large business in which each employee has a separate assigned telephone number administered through a PBX or Centrex system, the "breakout" of telephone calls on a per-employee basis is simply a matter of tagging each toll call presented in the bill with the four-digit extension associated with the employee's telephone station.

Many homeowners are likewise desirous of being able to keep track of the toll calls made from various telephone station sets within the household. For example, the homeowner might like to be able to keep track of the toll charges incurred by calls made from a teenager's bedroom or from an office within the home. This is, of course, readily accomplished if the subscriber is willing to pay for multiple telephone lines—one, say, for general family use, another for the teenager, and another for the home office. Since telephone companies render their bills on a per-telephone-number basis, the desired "breakout" of calls made from various station sets within the house is provided automatically.

SUMMARY OF THE INVENTION

Such a "breakout" of telecommunications toll calls on a per-station basis is provided, in accordance with the invention, to households or other telecommunications endpoints which have subscribed to only a single telephone line—something that I have recognized is an as-yet-unattended-to need in the art.

I refer to this service as "station set billing."

In preferred implementations, subscribers wishing to avail themselves of "station set billing" may purchase and install telephone stations sets which are adapted to transmit to the telecommunications service provider, during a call, e.g., at the start thereof, a signal carrying a code which identifies that station set. The subscriber, additionally, may register with the telecommunications service provider one or more of the station sets' codes, which can be marked on the instrument, e.g., the bottom or side. Thus the telecommunications service provider is able to identify which station set within the household a call is being made from or to which a collect call is being made. The telecommunications service provider can thus readily "tag" the toll charge for that call in the subscriber's monthly bill as having been made from, or billed to, a particular station set, thereby effectuating the inventive "station set billing" service.

The station set may transmit the code at its own initiative. Alternatively, it may transmit the code in response to a query signal issued by the telecommunications service provider's equipment during call set-up. Preferably, the station set's code signal, as well as the query signal are of a type that cannot be heard by the human auditory system, such as a spread spectrum signal, thereby making the interchange of query and identifying signal imperceptible to the callers.

In other embodiments of the invention, instead of being incorporated into the telephone station sets, each of the telephone stations may be uniquely identified by way of having at least one of the telephone station sets connected in series or in parallel with an external device. Each of the external devices may be used to provide the above-described code signaling. Alternatively, a characteristic of the telephone line may be altered by the device so that the particular calling telephone may be determined. Characteristics that may be altered include line length and impedance.

Of course, inherent differences in the characteristics of the various telephone stations that may be detected can be employed to distinguish between the telephone stations without requiring any additional devices or special telephone station sets.

"Station set billing" is, first of all, an advantageous feature for subscribers who want it. Moreover, it is expected that it will be advantageous for telecommunications service providers to offer this service because they will able to charge separately for it. Also, the ability to differentiate among the calls made from various station sets within the household provides a basis on which a telecommunications service provider can establish a customer relationship with various telephone users at the subscriber location, rather than just with the person in whose name the phone is listed, is a further advantage for telecommunications service providers.

DETAILED DESCRIPTION

Figure 1:
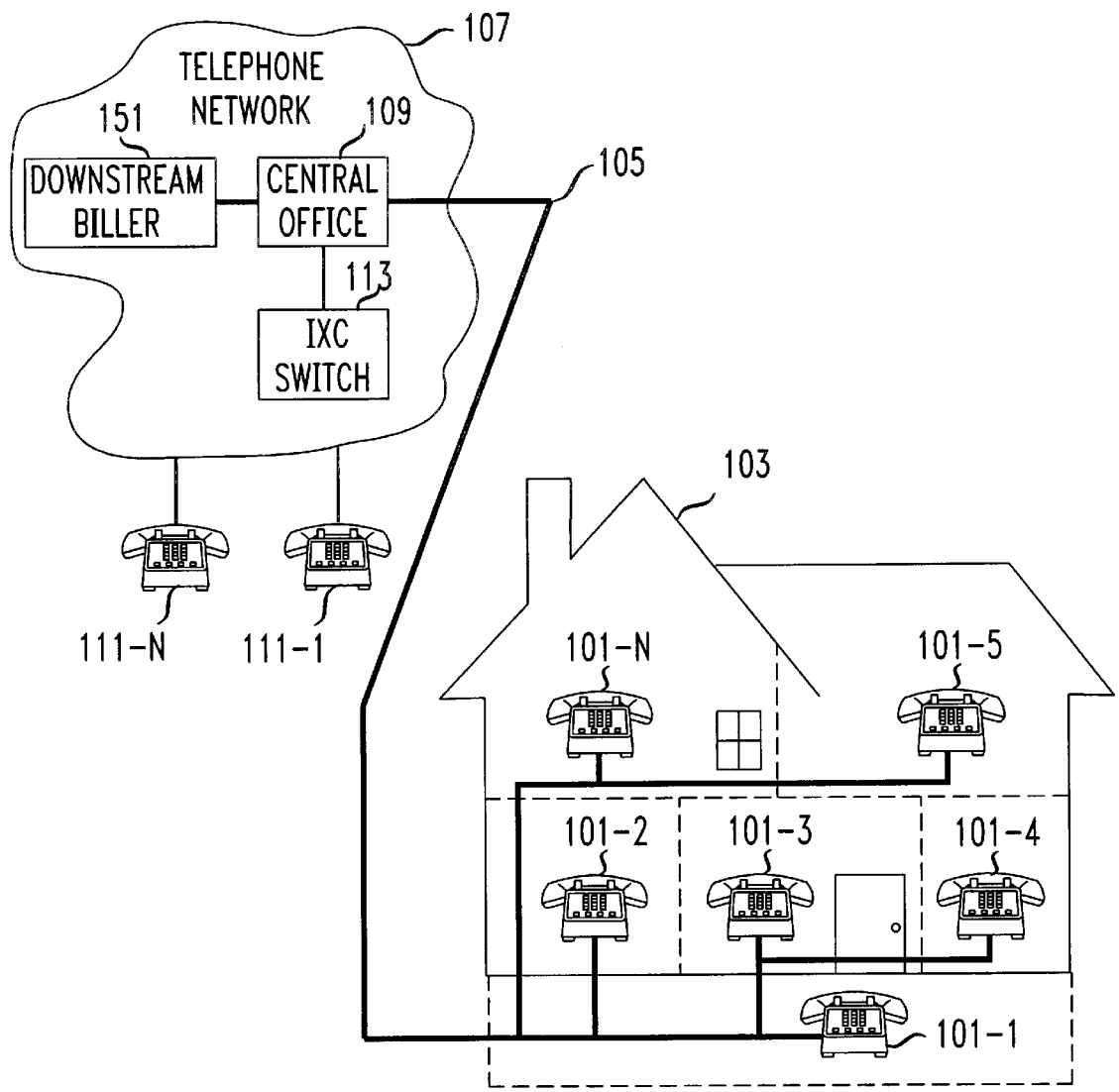
FIG. 1 shows an exemplary system arranged so that a "breakout" of telecommunications toll calls on a per-station basis is provided, in accordance with the principles of the invention.

FIG. 1 shows an exemplary system arranged so that a "breakout" of telecommunications toll calls on a per-station basis is provided, in accordance with the principles of the invention. In particular, FIG. 1 shows telephone station sets 101, including telephone station sets 101-1 through 101-N, which are a) located within house 103 and b) connected to central office 109 of telephone network 107 by telephone line 105. FIG. 1 also shows that telephone network 107 can include, for example, 1) central office 109, 2) interexchange carrier switch 113, and 3) downstream biller 151. Telephones 111, including telephones 111-1 through 111-N, are connected to telephone network 107.

In the embodiment of the invention shown in FIG. 1, telephone line 105 is a conventional analog tip-ring telephone line and each of telephone station sets 101 are bridged thereon, i.e., connected thereto in parallel, in the conventional manner. As such, each of telephone station sets 101 may originate telephone calls over telephone line 105 and may answer calls carried via telephone line 105.

In one embodiment of the invention, each of telephone station sets 101 is adapted to transmit to the telecommunications service provider, during a call, e.g., at the start thereof, a signal carrying a code which identifies that station set. Each of the codes is unique. It is noted that one of the telephone station sets 101 may not transmit any code and it will be identified by the lack of such transmission.

Figure 3:
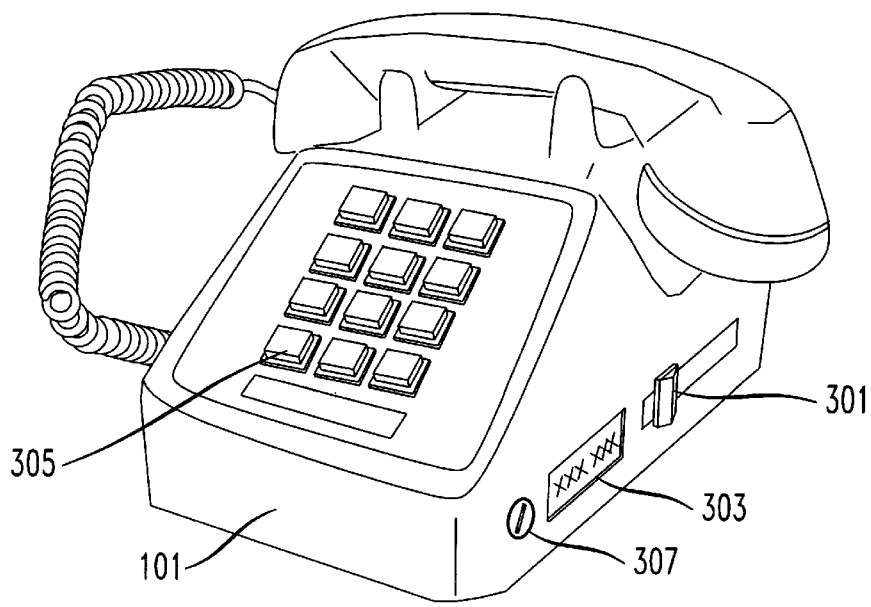
FIGS. 3 and 4 show exemplary arrangements by which a user may assign a unique identifying code to each of the telephone station sets within the house of FIG. 1, in accordance with an aspect of the invention.
Figure 4:
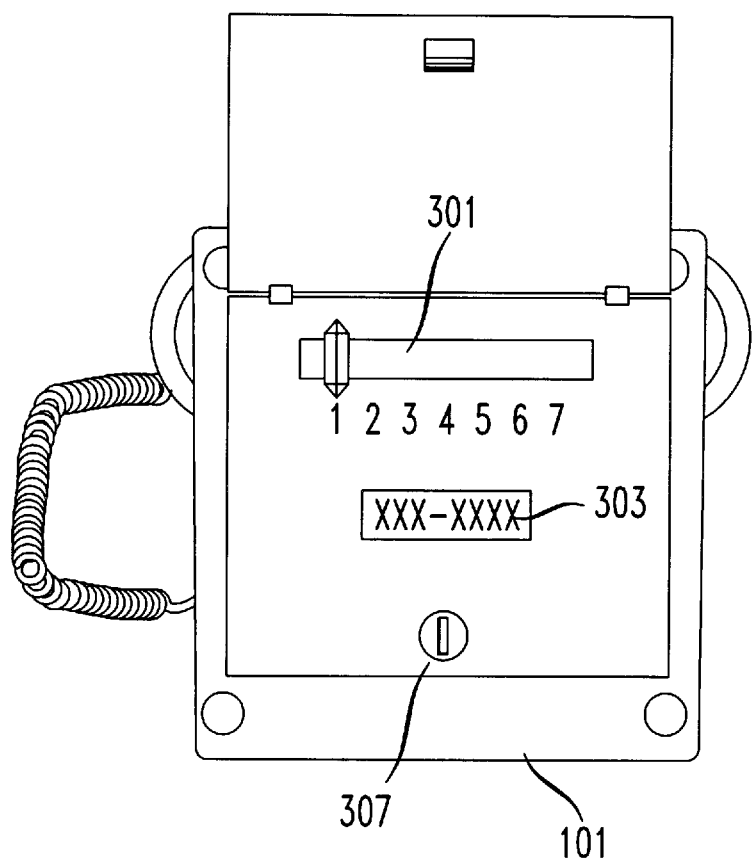

FIGS. 3 and 4 show exemplary arrangements by which a user may assign a unique identifying code to each of telephone station sets 101, in accordance with an aspect of the invention. In the arrangement of FIG. 3, slide switch 301 is made available with several positions, each of which corresponds to a unique code. However, in order to avoid the code being changed at the whim of the caller, the selected position of the slide switch, as indicated by the location of its arm, may be read into the memory of telephone station sets 101 only when a predetermined security code is entered on keypad 305. For example, the predetermined code could be "*#36297". The predetermined code would be kept secret by the person desiring to have the breakout of the calls. Alternatively, telephone station sets 101 could incorporate optional lock 307 and the predetermined code may be set by switching the key from an "unlocked" to a "locked" position. Area 303 may be used to write thereon the number assigned to the station for future reference.

Other conventional security techniques may be used to prevent unauthorized changing of the code. For example, FIG. 4 shows the bottom of the telephone incorporating slide switch 301 and writing area 303. The code for telephone station sets 101 is constantly updated to whatever is the present value of slide switch 301. However, to prevent the number from being changed, a hinged cover plate is locked into place over slide switch 301 and writing area 303. It is noted that instead of a slide switch miniature locking push buttons may also be employed.

In another embodiment of the invention, the code for each of telephone station sets 101 may be entered using programming techniques in addition to a predetermined security code. For example, if the predetermined code is "*#36297" the next digit entered could be used as the identifying code to each of telephone station sets 101.

Of course, the telephone station set may be preset at the factory to a particular identifying code.

Figure 2:
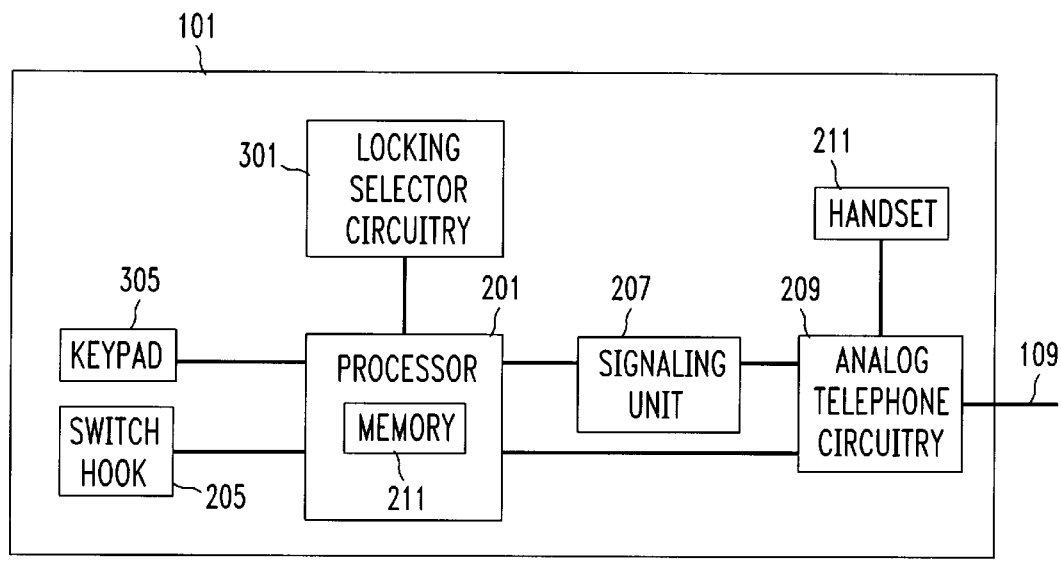
FIG. 2 is a simplified block diagram view of the circuitry of an exemplary telephone station set for use in the telephone station sets within the house of FIG. 1.

FIG. 2 is a simplified block diagram view of exemplary circuitry of telephone station set 101 of either FIGS. 3 or 4. Processor 201, which includes memory 211, is connected to locking selector circuitry 203—which, for telephone station set 101 is the electronics of slide switch 301—, keypad 305, switch hook 205, signaling unit 207 and analog telephone circuitry 209.

Processor 201 provides all the computational capability necessary to control all the processes of telephone station set 101. Memory 211 stores program code and data for use by processor 201. Processor 201 can determine, independently, a) which buttons, if any, of keypad 305 are pressed, b) the state of the switch hook, i.e., is telephone station set 101 in an on-hook state or an off-hook state, and c) the position of the arm of slide switch 301.

Processor 201 can also cause signaling unit 207 to supply dual tone multi-frequency signals and other signals over telephone line 109 via analog telephone circuitry 209. One such transmitted signal may be the signal transmitted over telephone line 105 identifying the one of station sets 101 originating a call, or accepting a collect call. Signaling unit 207 also receives dual tone multi-frequency signals and/or other signals over telephone line 109 via analog telephone circuitry 209 and informs processor 201 of the type of signal received. One such received signal may be a signal on telephone line 105 that indicates that the one of station sets 101 originating a call, or accepting a collect call, should transmit its identification code.

In addition to the above-described telephone line interface functionality, analog telephone circuitry 209 also causes telephone station set 101 to go on-hook and off-hook in response to commands from processor 201. Also, analog telephone circuitry 209 passes signals from handset 211, which is used for voice communication, via analog telephone circuitry 209.

In other embodiments of the invention, instead of being incorporated into the telephone station sets, each of the telephone stations may be uniquely identified by way of having at least one of the telephone station sets connected in series or in parallel with an external device. For example, such a device may have the same structure as is shown in FIG. 2, but excluding handset 211 and switch hook 205, and optionally excluding keypad 305. Each of the external devices may be used to provide the above-described code signaling. Alternatively, a characteristic of the telephone line may be altered by the device so that the particular calling telephone may be determined. Characteristics that may be altered include line length and impedance.

The subscriber may register with the telecommunications service provider one or more of the station sets' codes, which can be marked on the instrument, e.g., the bottom or side. Such information may be stored in a) one or more of the switches in telephone network 107, b) downstream biller 151, c) in one or more databases or adjunct that can be coupled to the switches, or d) in one or more databases or adjunct that can be coupled to downstream biller 151. Thus the telecommunications service provider is able to identify which station set within the household a call is being made from, or to which a collect call is being made, so that the telecommunications service provider can readily "tag" the toll charge for that call in the subscriber's monthly bill as having been made from, or to, a particular station set.

Note that any particular subscriber may subscribe to telecommunications services from one or more various telecommunications service providers. Such telecommunications service providers may be a local exchange carrier (LEC), an interexchange carrier, a combination thereof, or the like. Thus, one or more of a subscriber's telecommunications service providers may implement the invention, as each may render its own bill for particular calls that it carries as the provider responsible for call billing. If so, the signal carrying the code which identifies the originating station set, or the one at which a collect call is being accepted, may be transmitted multiple times for a single call or at different points during for different calls, to allow the proper carrier to detect the identification signal. To be sure that the signal which identifies the originating station set is transmitted at a time when the telecommunications service provider needs to receive it, the station set may transmit the identification signal in response to a query signal issued by the telecommunications service provider's equipment during call set-up. Preferably, the station set's code signal, as well as the query signal are of a type that cannot be heard by the human auditory system, such as a spread spectrum signal, thereby making the interchange of query and identifying signal imperceptible to the callers. Also resulting from such an arrangement may be a need for the subscriber to register the station sets' codes with one or more of the telecommunications service provider.

To understand the present invention, the typical arrangements in telephone networks for recording messages used to bill charges for telephone calls should first be described. Such arrangements operate by recording the relevant billing data for each toll call, or connection, in a so-called automatic message account, or AMA, message record. Typical message record fields are the originating and terminating telephone numbers and elapsed time of call. In a typical system, the message records, which are opened for each call upon receipt of answer supervision for the call and are closed at a time substantially contemporaneous with the termination of the call, are transmitted from an originating switch to a message accumulation system. The latter distributes the accumulated messages to appropriate further processing systems which translate the AMA message records into the industry-standard "exchange message interface," or EMI, message record format.

The EMI records are thereupon forwarded to a rating system which, inter alia, computes the toll charges applicable to the calls and adds an indication of those charges to the EMI record. The records so formed are forwarded to a billing system in which they reside until processed to generate, typically, "hard copy" bills which are mailed to subscribers. Thus, conceptually, each subscriber is associated with an account to which the cost of calls are charged until they are billed and payment becomes due.

As is well known, the cost for each toll call, as rated by a rating system, is usually determined as a function of the length of time that passes while the originating subscriber is connected to the terminating subscriber. The total length of time that passes while the originating subscriber is on the call after answer supervision is divided into indivisible time periods, usually having identical predetermined lengths, and a period cost is assigned to each period. A typically used value for the length of each indivisible time period is one minute. The number of time periods is rounded up, so that each call has an integral number of indivisible time periods. The totalized cost of the period costs for all of the time periods of the call is the cost of the call.

Although a current practice in the art is to employ the above-described three-layered billing architecture and the various types of records, there is no conceptual reason why a simplified, e.g., one or two level, architecture using a single record type cannot be utilized instead. Therefore, for clarity of exposition, it is assumed herein that all billing aspects of a call are handled by downstream biller 151. Downstream biller 151 employs simply so-called "billing records", the initial version of which, if any, for each call is received from the switch responsible for billing the call and populates the fields thereof as necessary. Appropriate bills are periodically generated for each subscriber. Those of ordinary skill in the art will be able to implement the invention from the description hereinbelow using a billing architecture of their choosing.

Figure 5:
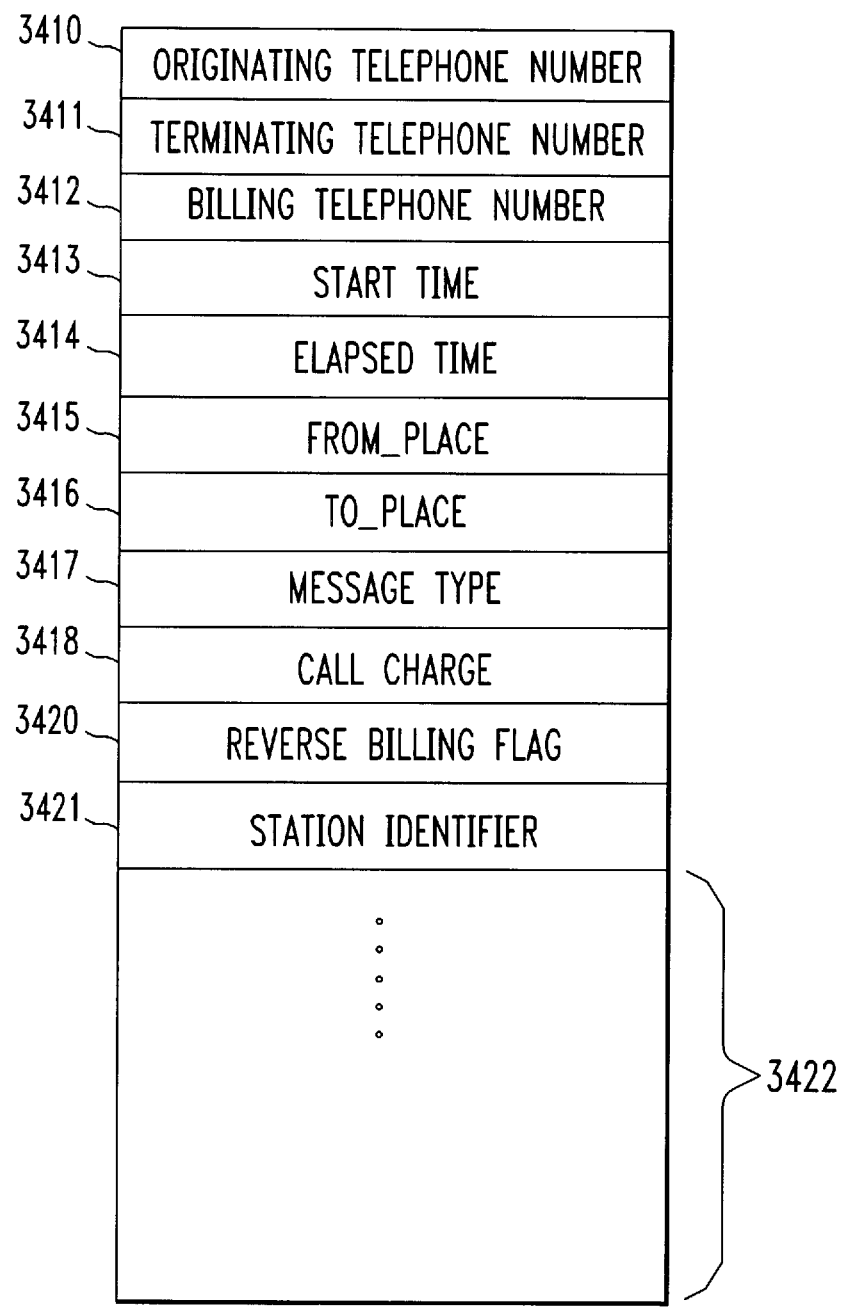
FIG. 5 is a conceptual representation of a billing record for use with the invention.

FIG. 5 is a conceptual representation of a billing record for use with the invention. The fields are shown arranged for pedagogic convenience. Some of the more significant fields of the billing record are the originating telephone number 3410 (i.e., the telephone number (ANI) of the originating subscriber); the terminating telephone number 3411 (i.e., the telephone number (ANI) of the terminating subscriber); the billing telephone number 3412, which while typically empty is used to indicate the account of the party responsible for the cost call if the cost is not to be associated with the telephone number of the originating telephone; the start time for the call 3413; the elapsed time 3414, i.e., the duration of the call; the geographic call origination and termination points, e.g. Edison, N.J. and San Francisco, Calif., denoted as FROM_PLACE 3415 and TO_PLACE 3416; message type 3417, which indicates that the call was, for example, a direct-dialed domestic call, an operator-assisted international call, etc.; call charge 3418, which is the basic call cost for the call computed as a function of various ones of the message characteristics recorded in the billing message such as described above; reverse billing (collect call) flag 3420; station identifier field 3421, in accordance with an aspect of the invention; and various other data fields denoted as 3422.

Figure 6:
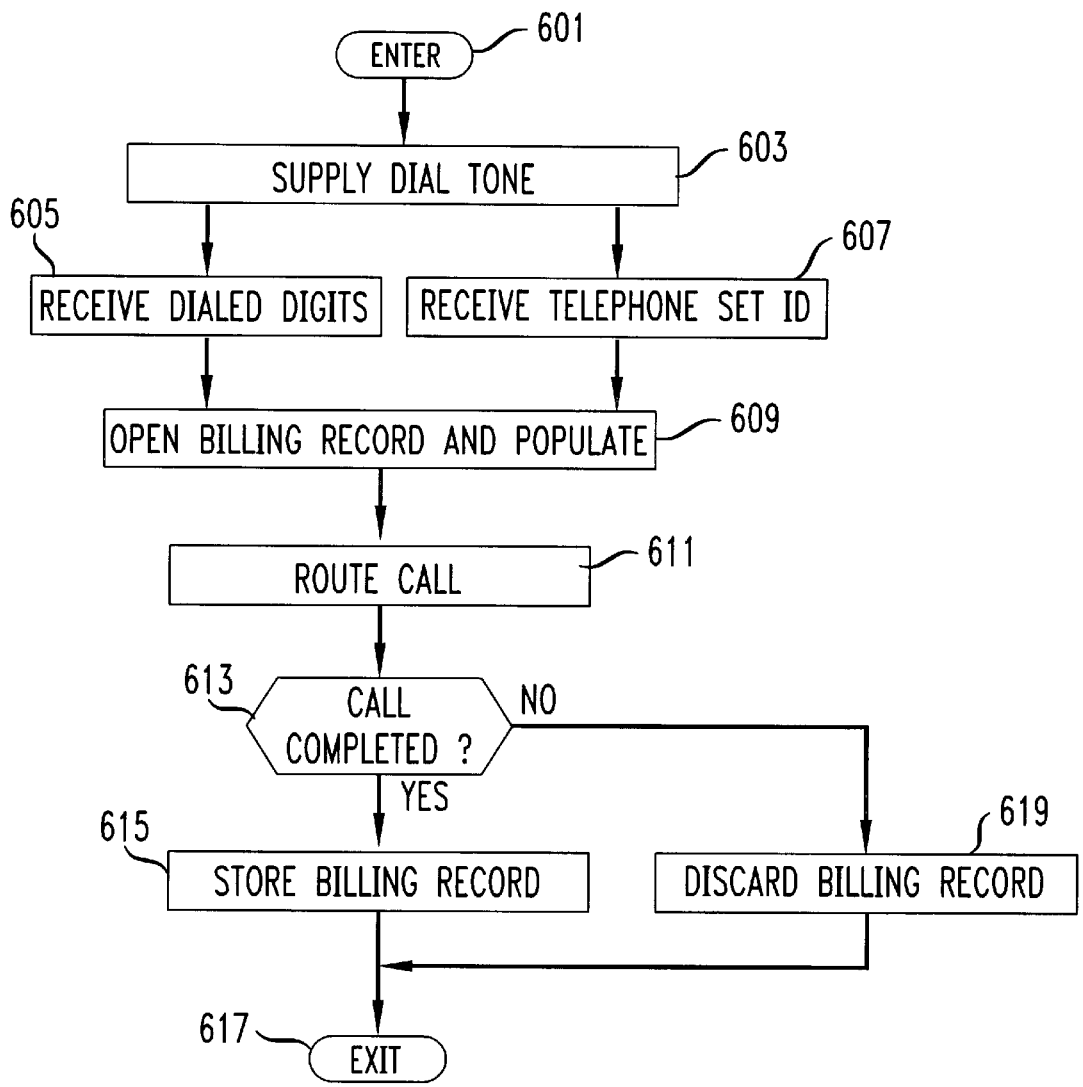
FIG. 6 shows an exemplary process for originating a telephone call and marking each billing record with an indication of the telephone station at which the call was originated.

FIG. 6 shows an exemplary process for originating a telephone call and marking each billing record with an indication of the telephone station at which the call was originated. The process is entered in step 601 when a caller goes off-hook at one of telephone station sets 101 (FIG. 1). In step 603 (FIG. 6), dial tone is supplied by central office 109. In step 605 digits dialed by the caller are received at central office 109. In step 607 central office 109 receives, or determines, the identity of the particular one of telephone station sets 101 at which the call is being originated. Steps 605 and 607 may be done in any order and may be done in parallel.

As noted, the telephone station set may transmit the code at its own initiative. Alternatively, it may transmit the code in response to a predetermined query signal received during call set-up on telephone line 105. Such a query signal may originate at central office 109 or IXC switch 113. Such implementation details may be used by the implementor to determine the ordering of steps 605 and 607. Also, the particular ordering of steps 605 and 607 may depend upon whether the call is a local call or an interexchange call.

Next, in step 609, interexchange carrier switch 113 opens a billing record for the call and populates it with the appropriate, currently available. In accordance with an aspect of the invention, one such piece of information is the station identifier. Thereafter, in step 611, the call is routed to its destination, e.g., one of telephones 111. Conditional branch point 613 tests to determine if the call was completed, e.g., was the call answered at the destination. If the test result in step 613 is YES, control passes to step 615, in which the billing record is updated with the length of the call and the billing record is stored. The process then exits in step 617. If the test result in step 613 is NO, control passes to step 619, in which the billing record is discarded. The process is then exited in step 617.

Figure 7:
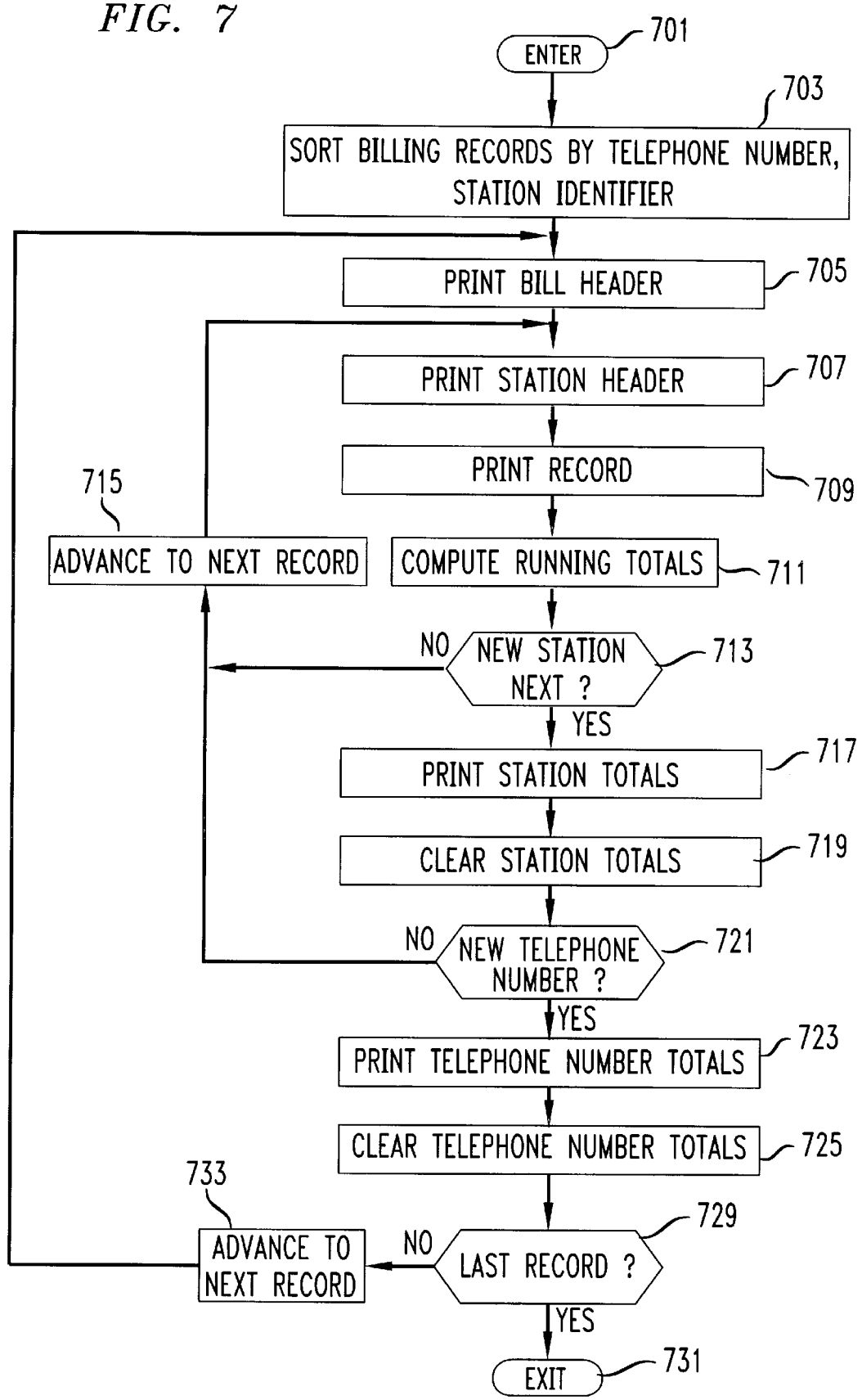
FIG. 7 shows an exemplary process for developing a subscribers bill using "station set billing", in accordance with the invention.

FIG. 7 shows an exemplary process for developing a subscribers bill using "station set billing", in accordance with the invention. The process is entered, in step 701, when it is time to run the monthly bills. In step 703, the billing records are sorted using at least the telephone number field and station identifier field as the "key" fields for the sort. Next, in step 705, a bill header is printed for the subscriber corresponding to the first listed record in the sorted billing records. In particular, the bill header typically includes the subscriber's name, address and telephone number. The header for the station identified as having originated the call, if any, is printed in step 707, in accordance with an aspect of the invention. This header may include simply the station identifier as stored in billing record or it may include more descriptive information derived therefrom. Next, in step 709, the record is printed as an itemized detail line of the bill. Thereafter, in step 711, the running totals, by station and by telephone number are computed, in accordance with an aspect of the invention.

Conditional branch point 713 tests to determine if the next record corresponds to a new telephone station. A new telephone station may be indicated by the same telephone number and a different telephone station identifier or simply by a different telephone number regardless of the telephone station identifier. If the test result in step 713 is NO, control passes to step 715 which advances to the next record. Control then passes back to step 707 and the process continues as described above.

If the test result in step 713 is YES, control passes to step 717 in which the station totals are printed on the bill being prepared. Next, in step 719, the station totals are cleared. Conditional branch point 721 then tests to determine if the next record corresponds to a new telephone number. If the test result in step 721 is NO, control passes back to step 715, and the process continued as described above. If the test results in step 721 is YES, control passes to step 723, in which the totals for the telephone number being printed on the bill along with any other information which is printed at the end of the bill. In step 725, the telephone number totals are cleared.

Conditional branch point 729 tests to determine if the record just processed is the last record. If the test result in step 729 is YES, the process exits in step 731. If the test result in step 729 is NO, control passes to step 733, which advances to the next record. The process then continues at step 705 as described above.

When the process is executed, any record, or series of records, for which there is no station identifier is processed without employing station headers or totals, e.g., in the conventional manner.

In an alternative embodiment of the invention, the bill may be arranged so as to print the billing in chronological order and, as part of the detail line printed, the station originating the call is identified.

More than one digit may be used to identify a station set. A more complex code with associated mapping may also be used. Thus, as noted, in any embodiment of the invention, instead of merely storing in the billing record, or listing on the bill, an identifier of the station originating the call, e.g., the code assigned to the telephone station, the telephone network may store more descriptive information. Such information may be looked up using, and substituted for, the code assigned to the telephone station.

Of course, the invention may be implemented so that modems or facsimile machines are identified as distinct stations.

The principles of the invention may also be employed with multiple cellular telephones that share the same telephone number.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A method for use by a telecommunications service provider, said method comprising the steps of:

determining when a telecommunications call was made from one of a plurality of extension station sets (the calling set), where a) said plurality of extension station sets are directly connected to an analog line emanating from an office and served by a single telephone number, b) from the office, the connection of each of said extension station sets presents nominally the same impedance on said analog line to said office, and c) the step of determining includes a step of receiving at said office an identifying signal that originates at said calling set from no user action other than placing said calling set in an off hook condition; and rendering a bill for said telephone number which includes charges for calls made from said extension station sets, said telecommunications call being identified in said bill as having been made from said calling set.

2. The invention as defined in claim 1 wherein said identifying signal comprises a preselected frequency spectrum.

3. The invention as defined in claim 1 wherein said determining step further includes the step of transmitting a query signal over said analog line and receiving, in response thereto, said identifying signal from said calling set.

4. The invention as defined in claim 3 wherein said identifying signal and query signals are of a type which is substantially imperceptible to a human being.

5. A method for use in obtaining an indication of the identity of a telephone station originating a telephone call, said telephone station being bridged in parallel with other telephone stations on the same analog telephone line and directly connected to a central office, each of said telephone stations having a unique identity, the method comprising the step of:

marking a billing record at said central office for said telephone call with a representation of the identity of said telephone station; and forwarding to a given address a bill that represents the billing records of calls made by all of said stations that are bridged in parallel.

6. The invention as defined in claim 5 further including the step of sorting on said bill the billing records for said telephone line by the representation of identity of said telephone station marked therein.

* * * * *